(12) United States Patent
Dearth et al.

(10) Patent No.: US 6,907,508 B2
(45) Date of Patent: Jun. 14, 2005

(54) STRUCTURE AND METHOD FOR MANAGING AVAILABLE MEMORY RESOURCES

(75) Inventors: Glenn Dearth, Groton, MA (US); Carl J. Lindeborg, Shrewsbury, MA (US); Robin L. Brown, Leominster, MA (US); James A. Duda, Waltham, MA (US); Sudhir Srinivasan, Chelmsford, MA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 118 days.

(21) Appl. No.: 10/376,354

(22) Filed: Feb. 26, 2003

(65) Prior Publication Data

US 2004/0168037 A1 Aug. 26, 2004

(51) Int. Cl.[7] .............................................. G06F 12/00
(52) U.S. Cl. ......................... 711/173; 711/5; 711/119; 711/122; 711/129; 711/147; 711/153; 711/170; 713/1; 713/100
(58) Field of Search ............................ 711/5, 119, 122, 711/129, 147, 153, 170, 173

(56) References Cited

U.S. PATENT DOCUMENTS

| | | | | | |
|---|---|---|---|---|---|
| 5,426,639 | A | * | 6/1995 | Follett et al. | 370/412 |
| 6,754,744 | B2 | * | 6/2004 | Kim et al. | 710/56 |
| 6,754,795 | B2 | * | 6/2004 | Chen et al. | 711/170 |
| 2003/0121030 | A1 | * | 6/2003 | Koob et al. | 717/152 |
| 2004/0131055 | A1 | * | 7/2004 | Calderon et al. | 370/381 |

* cited by examiner

*Primary Examiner*—Donald Sparks
*Assistant Examiner*—Bao Q Truong
(74) *Attorney, Agent, or Firm*—Morrison & Foerster LLP

(57) ABSTRACT

In a digital data processing system having a memory component, a structure and method for managing available memory resources. Free pointers to respective free memory blocks are stored in memory blocks maintained as a linked list. In a system having a hierarchically-organized memory component, a small number of the free pointers are maintained at a relatively higher performance level of the memory and the balance of the free pointers are maintained at a relatively lower performance level of the memory.

23 Claims, 5 Drawing Sheets

STRUCTURE AND METHOD FOR MANAGING AVAILABLE MEMORY RESOURCES

BACKGROUND OF THE INVENTION

1. Technical Field

The present invention relates generally to digital data processing systems, and, in particular, to structures and methods in digital data processing systems for managing available memory resources.

2. Background Art

In general, in the descriptions that follow, we will italicize the first occurrence of each special term of art which should be familiar to those skilled in the art of digital data processing systems. In addition, when we first introduce a term that we believe to be new or that we will use in a context that we believe to be new, we will bold the term and provide the definition that we intend to apply to that term. Since our invention is specifically intended for use in digital data processing systems, we will often use terms that are well known to those skilled in this particular art. For example, with respect to an individual element of information stored at a particular address in a memory component of such a system, we will typically use the term pointer to refer, not to the element per se, but to a separate and distinct element that contains the address of the referenced element. Other common terms of art that we may use include: b for bit and B for byte, msb for most significant bit and lsb for least significant bit; and MB for megabyte.

From at least the 1940's, programmers of digital data processing systems have employed various logical structures to manage available, unallocated memory resources. In one popular arrangement, a memory initialization process, activated during system initialization, partitions the available memory into a set of blocks, each comprising a conveniently-sized, continuous range of addresses in the memory that are not presently allocated to an active process. The process then constructs a linked list of these free blocks by storing into a pre-assigned address within each block a pointer or forward link to the immediately succeeding block on the list. In general, the primary access point of the list is a header which contains, at a minimum, a forward link for storing a pointer to the block at the head of the free list. If desired, the header may also include a backward link containing a pointer to the block at the tail of the free list. For convenience, the header may contain other information related to the status of the free list, such as the number of blocks currently on the free list.

In a typical modern digital data processing system incorporating a conventional, commercially available microprocessor, such as the Pentium® 4 from Intel Corporation, the memory component is hierarchically-organized into a plurality of separate and distinct layers, e.g., a high-speed, but relatively small level A, and a slower but larger level B. In such a system, it is most efficient to maintain the header in a memory resource that can be rapidly accessed by the central processing unit, which is typically a data cache or other high-speed circuit such as a register array or the like. For the purposes of our invention, we think of the resources at level A as being accessible in a single clock cycle, whereas accesses to the main memory component at level B require multiple clock cycles. Despite the expenditure of considerable resources by memory designers, we expect that this performance differential will only increase as advances in semiconductor manufacturing processes and deep-pipelining techniques enable the processor component to operate at significantly higher clock frequencies vis-à-vis the main memory component.

Shown by way of example in FIG. 1 is a hierarchically-organized memory 2 in which unallocated blocks of memory are managed by means of a free list 4 maintained, for example, at level B of the memory 2. Constructed in accordance with a known prior art memory initialization process, the exemplary list is comprised of: a first block, $B_A$ 6, (often called the tail of the list) having a null forward link ("Link") indicating that there are no lower blocks on the free list 4; a next higher block $B_B$ 8 having a forward Link that points to the next lower block $B_A$ 6; and so on up the list through blocks $B_C$ 10, $B_D$ 12, . . . , and $B_Y$ 14 to a top block $B_Z$ 16, (often called the head of the list) having a forward Link that points to the next lower block $B_Y$ 14. Within a header 18, maintained at level A of the memory 2, a forward link, Head 20, points to the free block at the head of the free list 4, namely $B_Z$ 16, and a backward link, Tail 22, points to the free block at the tail of the free list 4, which, in this example, is $B_A$ 6.

Note: In the several figures we will use a dashed connecting line to indicate that additional blocks may be present in the corresponding link but have not been shown to avoid making the illustrations unnecessarily complex.

In response to receiving from an active process, say Process_A, a request to allocate a block of free memory, a memory allocation process will typically allocate the block at the head of the free list. For the example shown in FIG. 1, block allocation can be as simple as:

1. Retrieving from Head 20 the pointer to the block at the head of the free list 4, namely block $B_Z$ 16;
2. Retrieving from the block $B_Z$ 16 the Link to the next lower block on the free list 4, namely block $B_Y$ 14; and
3. Storing the pointer to the block $B_Y$ 14 in Head 20.

Note: Various methods have been proposed for informing Process_A of the location (and size) of the allocated block, including just providing to Process_A the pointer to the block. In some applications, it may be desirable to have the memory allocation process link the newly allocated block onto a list of blocks "owned" by Process_A.

Thus, in a hierarchically-organized memory such as that shown in FIG. 1, block allocation requires a minimum of three memory accesses:

1. a read cycle at level A of the memory;
2. a read cycle at level B of the memory; and
3. a write cycle at level A of the memory.

In response to receiving from an active process a request to deallocate an allocated block of memory, a memory deallocation process will typically return the block to the head of the free list. Continuing with the example shown in FIG. 1 and assuming that Process_A has requested deallocation of the just-allocated block $B_Z$ 16, deallocation can be as simple as:

1. Retrieving from Head 20 the pointer to the block at the head of the free list 4, namely block $B_Y$ 14;
2. Storing into the forward Link of the block $B_Z$ 16 the pointer to the block $B_Y$ 14; and
3. Storing the pointer to the block $B_Z$ 16 in Head 20.

Note: If, as noted above, the memory allocation process maintains for Process_A a list of blocks owned by that process, the memory deallocation process is responsible for unlinking from Process_A's list the block that is being deallocated.

Thus, in a hierarchically-organized memory such as that shown in FIG. 1, block deallocation also requires a minimum of three memory accesses:

1. a read cycle at level A of the memory;
2. a write cycle at level B of the memory; and
3. a write cycle at level A of the memory.

Although we have illustrated the memory 2 as being comprised of only levels A and B, this is by way of example only and is not intended to suggest that the memory 2 is limited to only 2 levels or that the free list 4 and header 18 cannot be constructed so as to be stored together at the same level or separated by more than a single level. Furthermore, although we have selected as the context of this description a relatively large scale system which typically includes an operating system, other embodiments are certainly possible, including embedded systems which typically have no separate and distinct operating system, as well as purely hardware instantiations in which suitably programmed state machines accomplish the essential memory management processes. As will be clear to those skilled in this art, such decisions will be influenced by numerous factors, including hardware cost and system performance.

We submit that what is needed is a more efficient structure and method for managing available memory resources, and, in particular, one in which fewer accesses to the main memory component are required, on the average, to allocate and deallocate blocks of available memory.

SUMMARY OF THE INVENTION

In accordance with a simple embodiment of our invention, we provide a method, for use a digital data processing system having a memory component, for managing available resources in the memory. In this embodiment, we first partition a first portion of the memory into at least first and second blocks, and allocate the first block as a first pointer block. Next, we create a first pointer which points to the second block. Finally, we store the first pointer in the first pointer block, such that the first pointer now comprises a first member of a free pointer list. When the second block is allocated, the first pointer is removed from the free pointer list; when the second block is deallocated, the first pointer is recreated and added back to the free pointer list. The free pointer list is thus adapted to dynamically expand and contract so as to always accommodate the set of free pointers to all of the available blocks of the first portion of the memory.

In accordance with a more practical embodiment of our invention, we provide a method, for use a digital data processing system having a memory component, for managing available resources in the memory. In this embodiment, we first partition a first portion of the memory into n blocks and allocate m of the blocks as pointer blocks, each of which is adapted to store at most s pointers, where (n>m), (n>s) and ((m*s)≧(n−m)). Next, for each of the (n−m) blocks, we create a pointer which points to that block. Finally, we store s of the pointers in each of the first (m−1) of the pointer blocks, and the remaining ((n−m)−(m−1)*s)) of the pointers in the last of the pointer blocks, such that the pointers stored in the pointer blocks comprise a free pointer list. As blocks are allocated and deallocated, pointers are, respectively, removed from or added to the free pointer list, whereby the free pointer list dynamically expands and contracts so as to always accommodate the set of free pointers to all of the available blocks of the first portion of the memory. Preferable, a portion of the free pointer list is stored in a second portion of the memory, especially if the second portion, with respect to the first portion, is smaller is size but faster in operation.

In accordance with another embodiment of our invention, we provide a method, for use a digital data processing system having a memory component, for managing available resources in the memory. In this embodiment, we first partition a first portion of the memory into blocks, and then create a free pointer list comprised of pointers, each of which points to a respective one of the blocks. As blocks are allocated, we remove the respective pointers from the free pointer list; and, as blocks are deallocated, we add respective pointers to the free pointer list. Thus, we provide a mechanism whereby the free pointer list dynamically expands and contracts so as to always accommodate the set of free pointers to all of the available blocks of the first portion of the memory. Preferable, a portion of the free pointer list is stored in a second portion of the memory, especially if the second portion, with respect to the first portion, is smaller is size but faster in operation.

In accordance with yet another embodiment of our invention, we provide a method, for use a digital data processing system having a memory component, for managing available resources in the memory. In this embodiment, we first partition a first portion of the memory into a set of free blocks. During subsequent operation, we continuously maintain as a free pointer list a linked list of a first set of the free blocks, each of which stores a set of free pointers to each of the free blocks in a second set of the free blocks. In response to a first request from the system, we allocate the block in the set of free blocks pointed to by the free pointer at the head of the free pointer list, and then remove from the free pointer list the pointer at the head thereof. In response to a second request from the system, we return an allocated block to the set of free blocks; and add to the free pointer list at the head thereof a free pointer to the returned block. Again, we have provided a mechanism whereby the free pointer list dynamically expands and contracts so as to always accommodate the set of free pointers to all of the available blocks of the first portion of the memory. Preferable, a portion of the free pointer list is stored in a second portion of the memory, especially if the second portion, with respect to the first portion, is smaller is size but faster in operation.

In accordance with one other embodiment of our invention, we provide a method, for use a digital data processing system having a memory component, for managing available resources in the memory. In this embodiment, we first partition a first portion of the memory into at least (n+1) free blocks, and allocate as a free pointer block a first one of the free blocks, the first free block being sized to store at least n free pointers each at a respective slot within that block. Next, we initialize a head pointer to point to a first one of the slots in the free pointer block. Then, for each of the n other free blocks, we store into the slot in the free pointer block pointed to by the head pointer a free pointer to a respective one of the n free blocks, and advance the head pointer to point to a next succeeding slot in the free pointer block. In response to a first request from the system, we: retrieve from the free pointer block the one of the free pointers stored therein pointed to by the head pointer; allocate the free block pointed to by the retrieved free pointer; and retract the head pointer to point to a next preceding slot in the free pointer block. In response to a second request from the system, we: advance the head pointer to point to a next succeeding slot in the free pointer block; return a previously allocated block to the set of free blocks; and store into the slot in the free pointer block pointed to by the head pointer a free pointer to the returned free block. Once again, we have provided a mechanism whereby the free pointer list dynamically expands and contracts so as to always accommodate the set of free pointers to all of the available blocks of the first portion of the memory. Preferable, a portion of the free pointer list is stored in a second portion of the memory, especially if the second portion, with respect to the first portion, is smaller is size but faster in operation.

BRIEF DESCRIPTION OF THE SEVERAL VIEWS OF THE DRAWINGS

Our invention may be more fully understood by a description of certain preferred embodiments in conjunction with the attached drawings in which.

Figure 1:
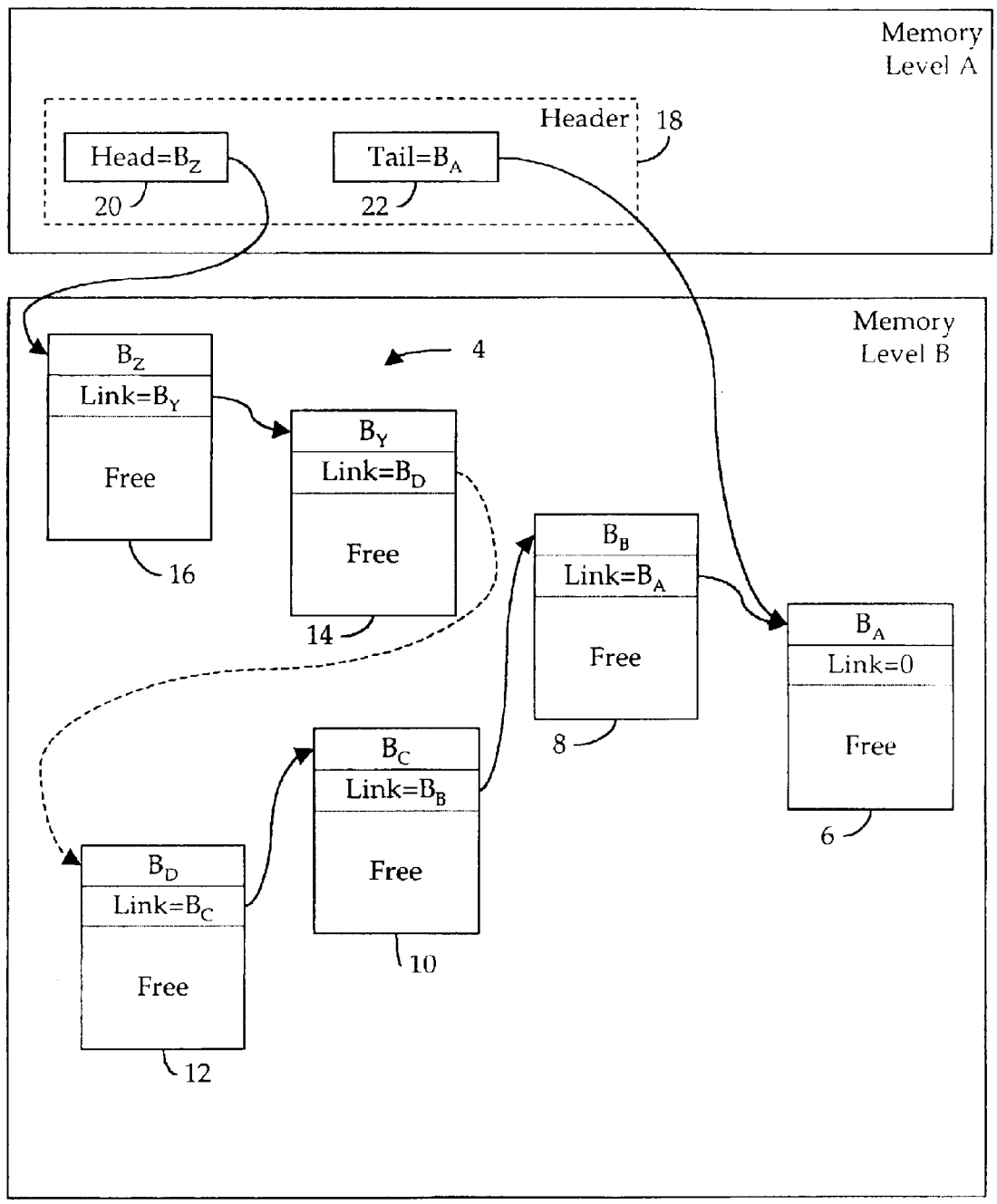
FIG. 1 is a block representation of a conventional free list used to manage available memory resources.

In the drawings, similar elements will be similarly numbered whenever possible. However, this practice is simply for convenience of reference and to avoid unnecessary proliferation of numbers, and is not intended to imply or suggest that our invention requires identity in either function or structure in the several embodiments.

DETAILED DESCRIPTION OF THE INVENTION

In accordance with the preferred embodiment of our invention, we manage available memory resources by maintaining a linked list, not of the free blocks of memory, per se, but rather of blocks of memory that we have allocated to store pointers to the free blocks. For convenience of reference, we refer to our list as a free pointer list and to the pointers themselves as free pointers.

Figure 2:
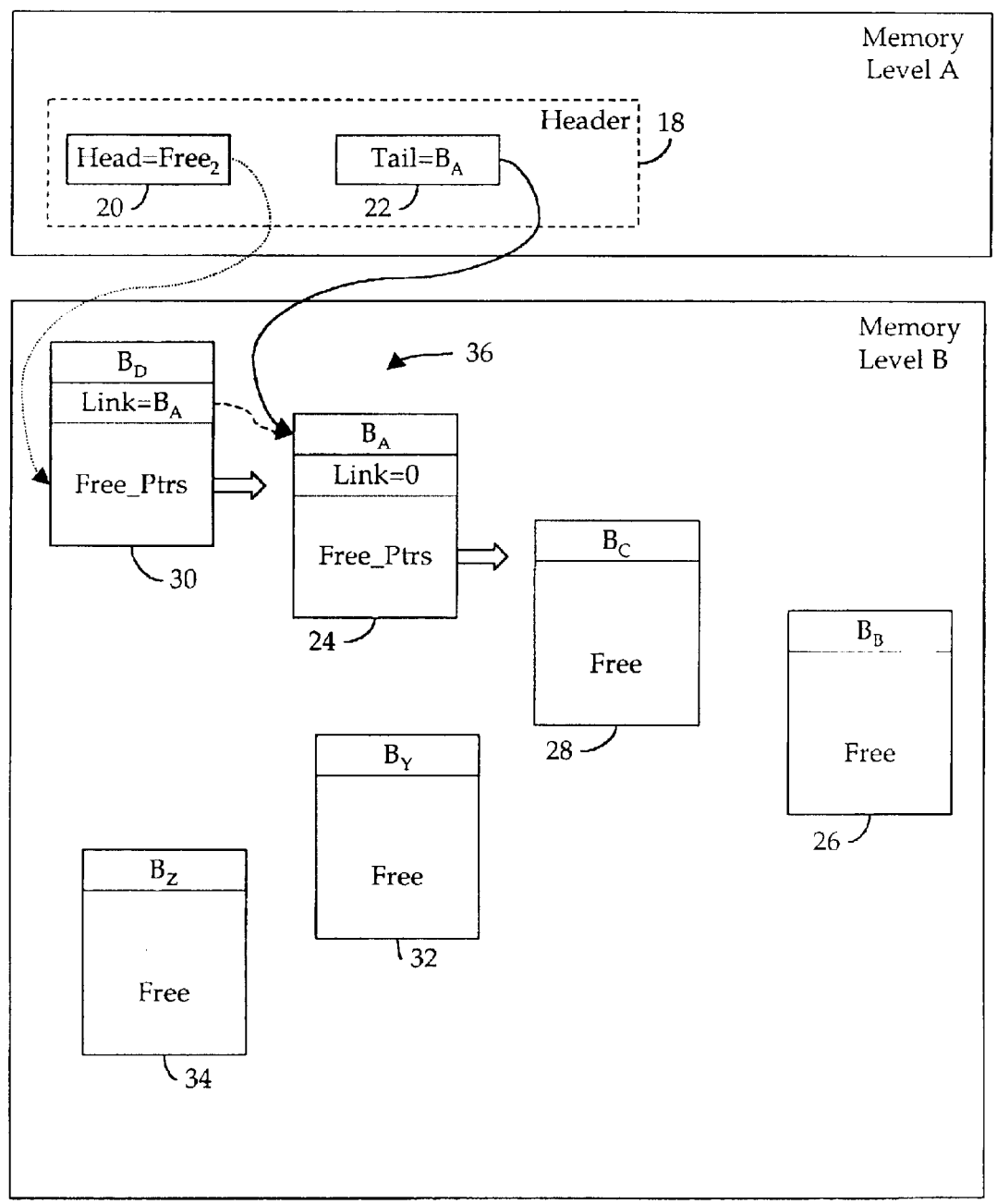
FIG. 2 is a block representation of a free pointer list constructed in accordance with a first embodiment of the present invention to manage available memory resources.
Figure 3:
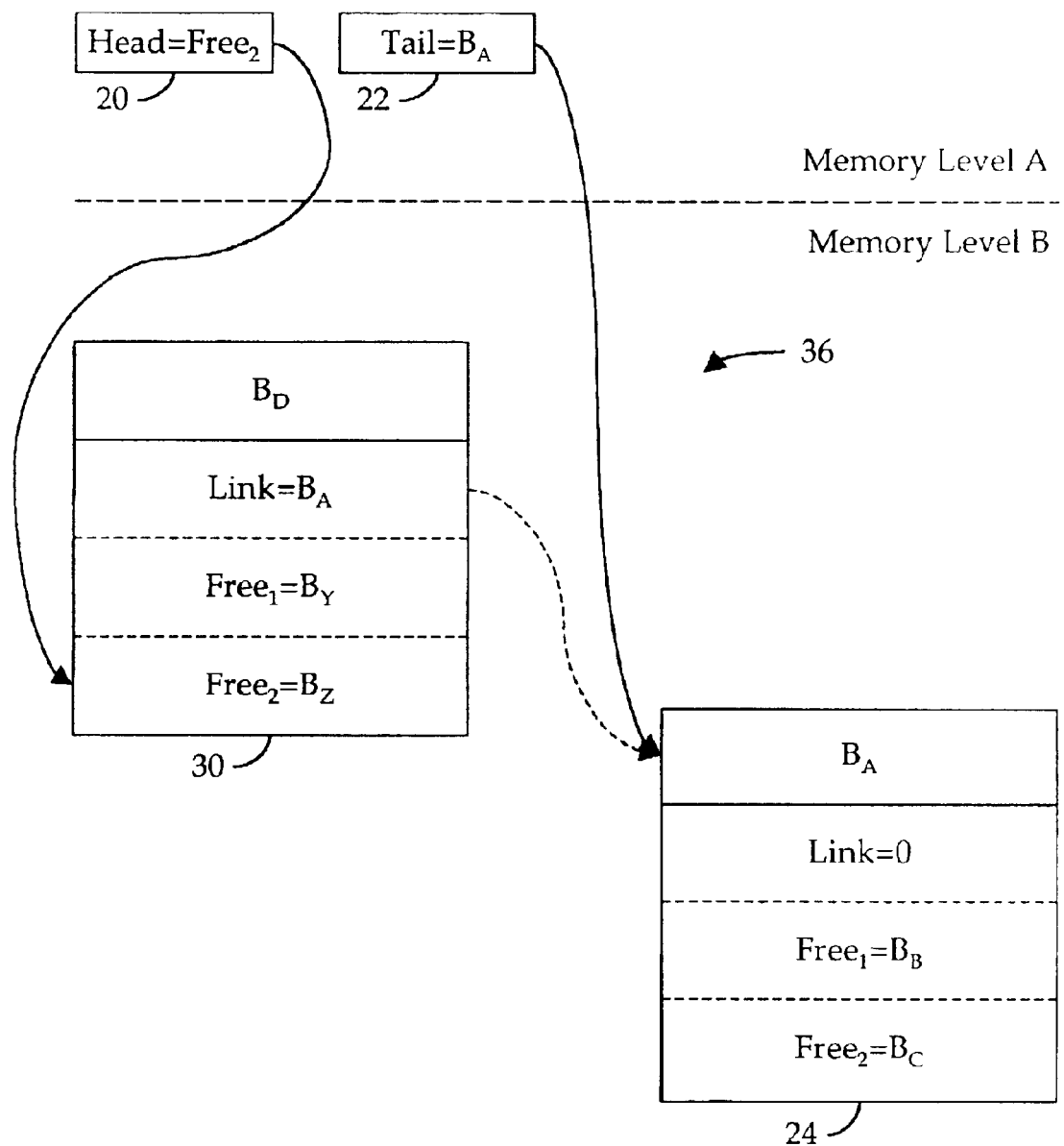
FIG. 3 is a more detailed block representation of the free pointer list of FIG. 2.

Shown by way of example in FIG. 2 generally, and in FIG. 3 in greater detail, is a memory system in which the available free blocks $B_A$ 24, $B_B$ 26, $B_C$ 28, $B_D$ 30, ..., $B_Y$ 32, and $B_Z$ 34 are managed using a free pointer list 36 consisting of only two free pointer blocks, $B_A$ 24 and $B_D$ 30, both stored at level B of the memory 2. To arrive at the illustrated configuration, our memory initialization process employs conventional techniques to identify the first free block in the available pool of memory, which in this example is $B_A$ 24. It then configures that block to be the first free pointer block in the free pointer list 36 by first initializing Head 20 to point to its forward Link slot, and then storing a null forward pointer in that forward Link slot (see, FIG. 3). Upon identifying $B_B$ 26 as the next free block, a corresponding free pointer is created, Head 20 is updated to point to the next available free pointer slot in free pointer block $B_A$ 24, which will be Free, and the newly created free pointer is stored in the slot pointed to by Head 20, i.e., Free,. Upon identifying $B_C$ 28 as the next free block, a corresponding free pointer is created, Head 20 is updated to point to the next available free pointer slot in free pointer block $B_A$ 24, which will be $Free_2$, and the newly created free pointer is stored in the slot pointed to by Head 20, i.e., $Free_2$. Upon identifying $B_D$ 30 as the next free block, a corresponding free pointer is created. However, upon attempting to update Head 20 the process will detect (e.g., using a conventional range checking algorithm) that all available slots in the free pointer block $B_A$ 24 are filled with valid free pointers. In response, the process will configure free block $B_D$ 30 to be the next current free pointer block by reinitializing Head 20 to point to its forward Link slot, and then storing into that forward Link slot a forward link to the now-filled free pointer block $B_A$ 24. This process continues until all free blocks are identified and respective free pointers have been stored in the linked list of free pointer blocks. Therefore, for the illustrated example, the free pointer corresponding to the last of the free blocks, $B_Z$ 34, will be stored in $Free_2$ of free pointer block $B_D$ 30, and, at the end of the memory initialization process, Head 20 will point to $Free_2$ of free block $B_D$ 30 as shown in both FIG. 2 and FIG. 3.

Note: In FIG. 2 we have used a dotted connecting line to indicate that Head 20 can point to any of the free pointer slots in the current free pointer block (and, indeed, to the forward Link as well) but have not been shown all possible variants to avoid making the illustration overly complex.

In the example shown in FIG. 2 and FIG. 3, each of the free pointer blocks, $B_A$ 24 and $B_D$ 30, is adapted to store only two pointers to respective blocks of free memory. Thus, in this simple example, we require a total of two memory blocks in order to manage a total of four free memory blocks (actually the total number of managed free blocks is six, as we will show below). Such an arrangement is considerably more efficient when implemented in a realistically sized memory system. For example, for a more typical block size of 512 B, a 256 MB memory can be partitioned into a total of 524,288 blocks. Assuming we use 32b pointers (a convenient size, although more bits than absolutely required) and reserve the first 64b of each free pointer block for the forward Link, then there is available space in each free pointer block to store 126 free pointers. In such an arrangement, we can pre-allocate 4,129 of the 524,288 available free blocks for use as free pointer blocks, giving us a total of 520,254 available slots for free pointers. Clearly, therefore, we can use 4,129 free blocks to manage the remaining 520,159 available free blocks, while wasting only 95 of the 520,254 available free pointer slots.

With the structure we have illustrated in FIG. 2 and FIG. 3, we prefer to allocate free memory blocks using the free pointer block at the head of the free pointer list 36. For convenience of reference, we will refer to this block as the active free pointer block. At the end of the memory initialization process, the free pointer block then being filled automatically becomes the first active free pointer block. Furthermore, since the memory initialization process continually updates Head 20 to point to the most recently filled slot, memory allocation can proceed immediately. Thereafter, as each free block is allocated, Head 20 is updated to point to the next valid free pointer. When an allocation request is received and there are no remaining valid free pointers in the active free pointer block, the now-empty active free pointer block is deactivated by copying its forward Link into Head 20, thereby activating the next free pointer block on the free pointer list 36. The now-deactivated free pointer block can now be returned to the pool of available free blocks, preferably by being allocated to satisfy the pending request for an available block of memory. Thus, free blocks and the respective free pointer blocks are consumed at proportional rates so that, under the most extreme condition of memory demand, the very last block available for allocation is the last of the free pointer blocks—no level B memory resources are wasted and the only level A resources dedicated to memory management are those in the header 18 for storing the forward and backward links, i.e., Head 20 and Tail 22.

> Note: by using Head 20 to keep track of the boundary between valid and invalid free pointers in the active free pointer block, it is not necessary to store null pointers into those slots that do not contain valid free pointers, and, indeed to do so, would significantly increase the number of memory write accesses and consume critical memory bandwidth.

By way of comparison with the prior art technique described above, let us start with the configuration shown in FIG. 2 and FIG. 3 and describe in detail exactly how our invention processes the first memory allocation request. In response to receiving from an active process, say Process_A, a request to allocate a block of free memory, our memory allocation process will allocate the free block pointed to by the first valid free pointer in the free pointer block at the head of the free pointer list 36. For the example shown in FIG. 2 and FIG. 3, obtaining a free block to satisfy the allocation request is accomplished by:

1. Retrieving from Head 20 the pointer to the $Free_2$ slot in the active free pointer block $B_D$ 30;
2. Retrieving from the $Free_2$ slot in the active free pointer $B_D$ 30 the pointer to the desired free block $B_Z$ 34; and
3. Updating Head 20 to point to the $Free_1$ slot in the active free pointer block $B_D$ 30.

Thus, in a hierarchically-organized memory such as that shown in FIG. 2 and FIG. 3, block allocation requires a minimum of three memory accesses:

1. a read cycle at level A of the memory;
2. a read cycle at level B of the memory;
3. a write cycle at level A of the memory.

Now, in response to receiving from an active process, say Process_A, a request to deallocate an allocated block of memory, a memory deallocation process will typically return the block to the head of the free pointer list 36. Continuing with the example shown in FIG. 2 and FIG. 3 and assuming that Process_A has requested deallocation of the just-allocated block $B_Z$ 34, deallocation can be accomplished by:

1. Retrieving from Head 20 the pointer to the Free, slot in the active free pointer block $B_D$ 30;
2. Updating Head 20 to point to the $Free_2$ slot in the active free pointer block $B_D$ 30; and
2. Storing into the $Free_2$ slot in the active free pointer block $B_D$ 30 the pointer to the now-free block $B_Z$ 34.

Thus, in a hierarchically-organized memory such as that shown in FIG. 2 and FIG. 3, block deallocation requires a minimum of three memory accesses:

1. a read cycle at level A of the memory
2. a write cycle at level A of the memory; and
3. a write cycle at level B of the memory.

Up to this point, we have shown that our invention, while certainly different structurally and procedurally from the conventional approach, has no significant performance advantage (in terms of memory access cycles). However, this balance shifts dramatically in favor of our invention if space is dedicated at memory level A sufficient to hold a reasonable number of the free pointers.

Figure 4:
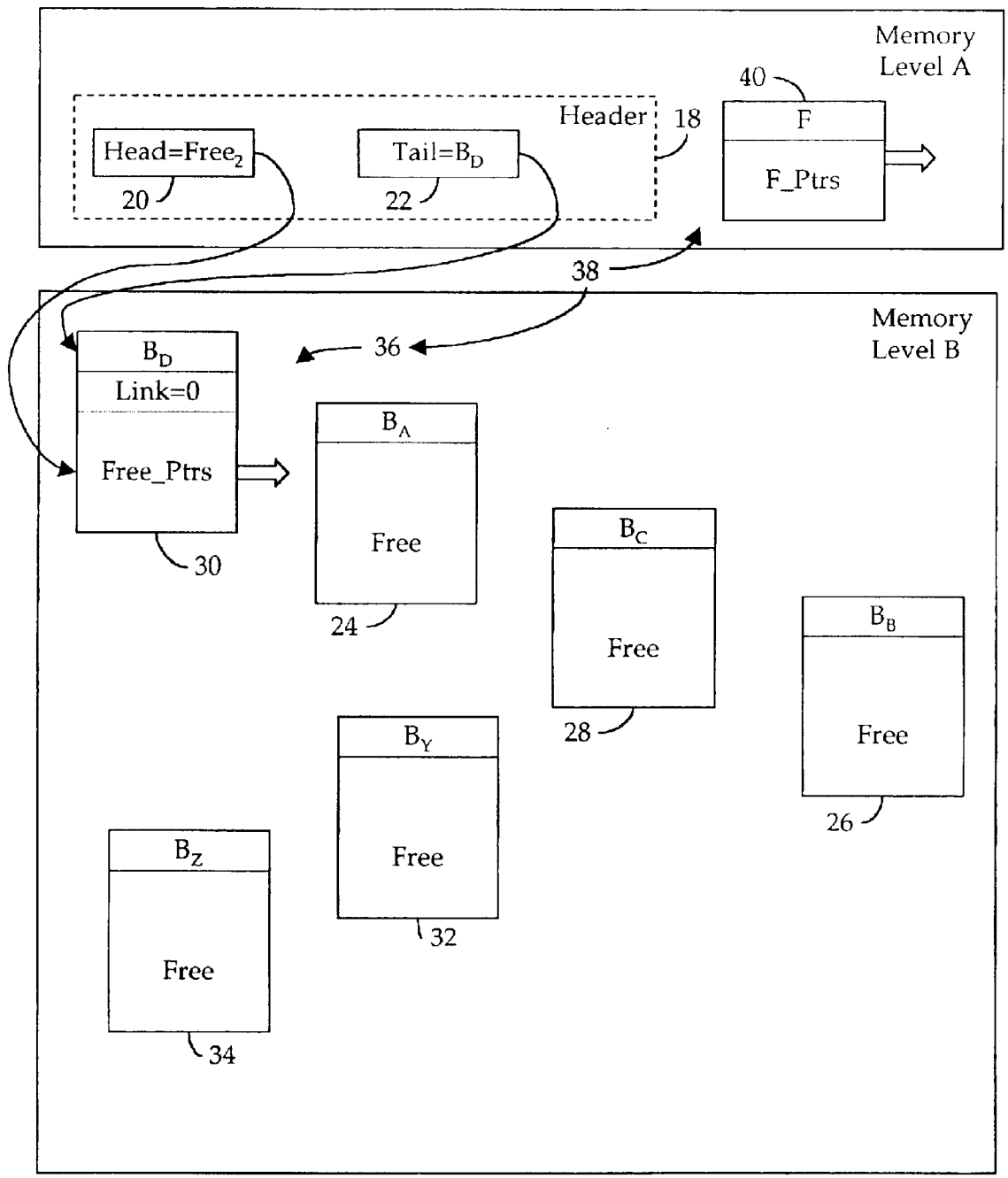
FIG. 4 is a block representation of a free pointer list constructed in accordance with a second embodiment of the present invention to manage available memory resources.
Figure 5:
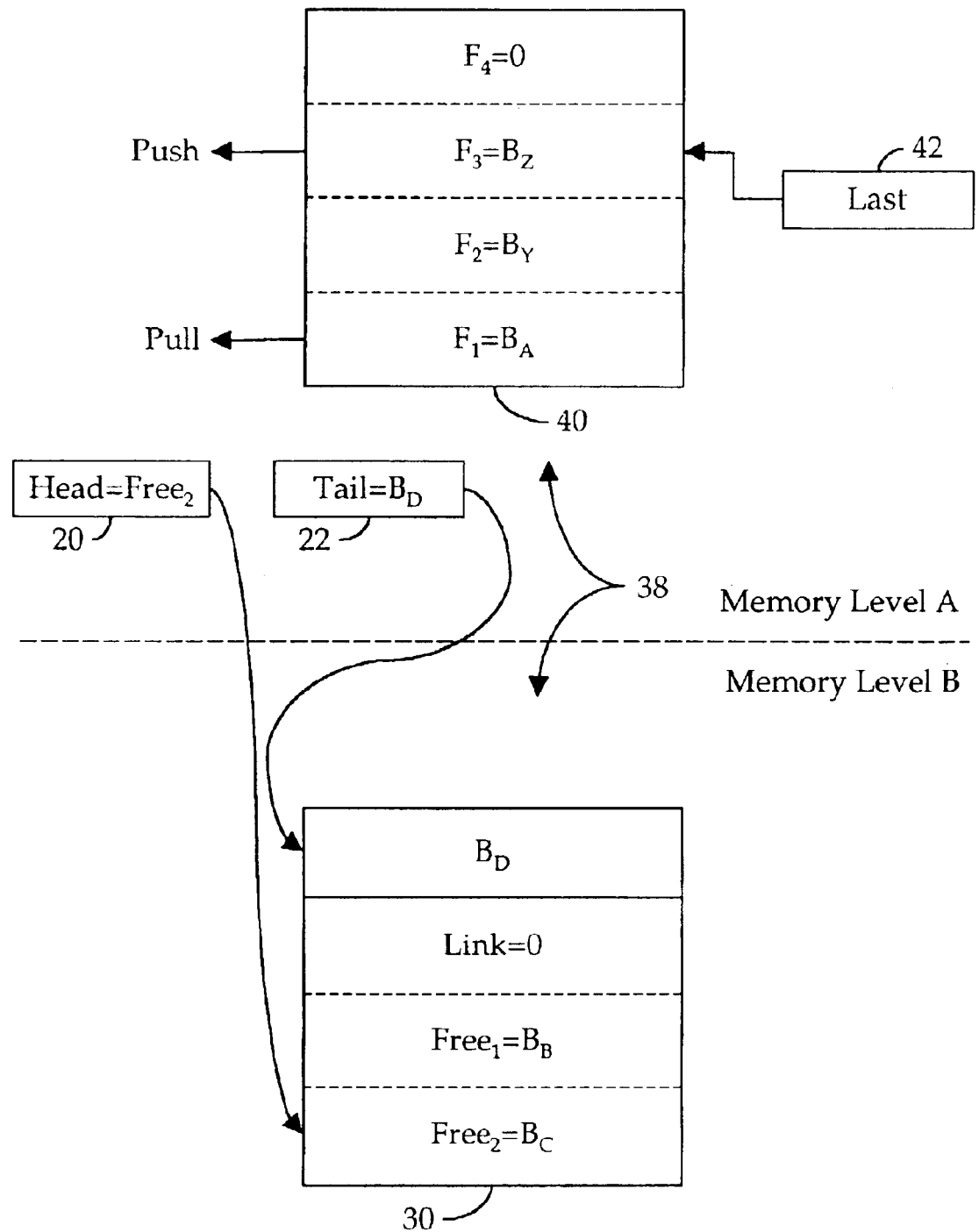
FIG. 5 is a more detailed block representation of the free list of FIG. 4.

Shown by way of example in FIG. 4 generally, and in FIG. 5 in greater detail, is a two-level free pointer list 38 constructed in accordance with an enhanced embodiment of our invention to maintain a relatively small number of the free pointers at memory level A and the remainder, if any, at memory level B. In general, the component of the free pointer list 38 resident at memory level B is substantially identical in structure (and method of construction) to the free pointer list 36 shown in FIG. 2 and FIG. 3. In addition, however, we have allocated a free pointer store, F 40, at memory level A to hold a predetermined number of the free pointers ("F_Ptrs"). Preferably, the free pointer store F 40 is sized so as to accommodate at a minimum the same number of free pointers as are in a free pointer block and, preferably, at least one more than the number of free pointers in a free pointer block.

In general, from a system perspective, the order in which free blocks are allocated is of little concern. Accordingly, the free pointer store F 40 can be operated as either a last-in, first-out ("LIFO") queue, as in the illustrated example, or as first-in, first-out ("FIFO") queue. With respect to implementation, the free pointer store F 40 can be constructed, for example, as either a circularly-managed buffer or a push-down stack, respectively. However, in a system in which allocation order is important, it may be desirable to select a particular one of the various known implementation options to satisfy this system constraint. For the purposes of this description, we will assume that the free pointer store F 40 is a LIFO queue implemented as a circularly-managed buffer. In such a configuration, a last pointer 42 will always point to the last free pointer that was added at the head of the queue.

In accordance with the preferred embodiment of our invention, our memory initialization process uses the free pointer store F 40 as a temporary work area to pre-assemble the free pointer blocks. At the start of the process, the free pointer store F 40 is empty, and the last pointer 42 will be nulled. Thus, when the first free block is identified, say free block $B_A$ 24, the last pointer 42 will advance to point to the $F_1$ slot in the free pointer store F 40 and a corresponding free pointer is stored in that slot. Upon identifying the second free block, $B_B$ 26, the last pointer 42 will advance to point to the $F_2$ slot in the free pointer store F 40 and a corresponding free pointer is stored in that slot. This process will continue until, as a result of advancing the lest pointer 42 to a predetermined maximum level, a push signal is asserted to signal the need to move a block of the free pointers from the free pointer store F 40 down to memory level B. Thus, in the illustrated example, a push operation will be initiated when the last pointer 42 advances to the $F_3$ slot of the free pointer store F 40. This will first occur when, upon identifying the third free block, $B_C$ 28, the process advances the last pointer 42 to point to the $F_3$ slot and then stores a corresponding free pointer in that slot. In the course of the resultant push operation, the process will configure the next free block that it identifies, which in this example is $B_D$ 30, to be the first free pointer block in the free pointer list 36 by first initializing Head 20 to point to its forward Link slot, and then storing a null forward pointer in that forward Link slot (see, FIG. 5). The process then moves the appropriate number of free pointers from the free pointer store F 40 into the respective slots in the new free pointer block, continuously updating Head 20 as described above as free pointer slots are filled, and simultaneously retracting the last pointer 42 after each free pointer is successfully moved.

At the end of the push operation, the last pointer 42 will again point to the $F_1$ slot of the free pointer store F 40, the only slot containing a valid free pointer (in this example to block $B_A$ 24). With space now available in the free pointer store F 40, the memory initialization process can resume normal operation. Upon identifying the next free block, which in this example happens to be $B_Y$ 32 (ignoring for reasons of economy of explanation any intervening blocks), the last pointer 42 will advance to point to the $F_2$ slot in the free pointer store F 40 and a corresponding free pointer is stored in that slot. Finally, upon identifying the last free block, which in this example happens to be $B_Z$ 34, the last pointer 42 will advance to point to the $F_3$ slot in the free pointer store F 40 and a corresponding free pointer is stored in that slot. At this point, the push signal is again asserted, indicating that a push operation should be initiated if additional free blocks are identified. Although in this example this will not happen, in general, in a system having a larger memory component, this process would continue until all free blocks have been identified and respective free pointers have been stored, first in the free pointer store F 40 and then, as necessary, pushed onto the linked list of free pointer blocks.

With the structure we have illustrated in FIG. 4 and FIG. 5, we prefer to satisfy each allocation request with the free block pointed to by the free pointer stored at the slot in the F 40 currently pointed to by the last pointer 42. As each free block is allocated, the last pointer 42 is retracted by one slot. Thus, in the illustrated example, free block $B_Z$ 34 will be allocated to satisfy the first request for memory, and, as a result, the last pointer 42 will be retracted to point to the $F_2$ slot. This process will continue until, as a result, the last pointer 42 falls below a predetermined minimum level, and a pull signal is asserted to signal the need to move free pointers previously pushed down to memory level B back up to memory level A. In the illustrated example in which the free pointer store F 40 can accommodate only 4 free pointers, we suggest a pull operation be initiated immediately upon the retraction of the last pointer 42 to point to the first slot, $F_1$. This will first occur when, as a result of allocating free block $B_Y$ 32 to satisfy the second request for memory, the process retracts the last pointer 42 to point to the $F_1$ slot. In the course of the resultant pull operation, the process will retrieve from Head 20 the pointer to the first valid free pointer in the free pointer block at the head of the free pointer list 36, namely $B_D$ 12. The process then moves the appropriate number of free pointers from the free pointer store F 40 into the respective slots in the F 40, continuously updating Head 20 as described above as each free pointer slot is emptied, and simultaneously advancing the last pointer 42 as each free pointer is successfully moved. If, as a result of a pull operation no valid free pointers remains in a free pointer block, the pull operation can unlink that block from the free pointer list 36 and insert a corresponding free pointer to the now-free block in the next available slot in the free pointer store F 40.

As will be clear, the preferred embodiment of our invention avoids the necessity of accessing the free pointer list 36 residing at level B of the memory component in the course of servicing each and every request from an active process to allocate/deallocate a block of memory. Rather, our invention tends to limit such routine activities to level A of the memory; only during the push/pull operations will level B be accessed, and even then the activity tends toward relatively short bursts of clustered accesses. This process will be particularly efficient if level B of the memory is adapted to efficiently support block accesses.

In general, the processes we have described above will allow the push/pull operations to be scheduled in the background. Thus, these operations will tend to have minimal impact on system performance except, perhaps, during unusually long sequences of requests for memory allocation or deallocation. However, to realize the greatest performance advantage from our invention, we recommend that a careful analysis be performed to understand the anticipated dynamic behavior of the system application so that the size of the free pointer store F 40 can be optimized. On the one hand, if the free pointer store F 40 is too small for a given system, significant performance will be lost in unnecessary push/pull operations; on the other, if it is too large, the excess level A space, being unavailable to other critical activities, may itself result in significant performance degradation. Of course, it is certainly possible, in a suitably configured system, to use conventional activity monitoring algorithms to dynamically adjust the size of the free pointer store F 40 as demands on the system vary over time and under different workloads.

Thus it is apparent that we have provided a structure and method for efficiently managing available memory resources. In particular, we have disclosed a structure and method for managing available memory resources. Furthermore, we have disclosed a structure and method for managing available memory resources indirectly, by means of a list of free pointers, rather than directly as in the prior art. In a system having a hierarchically-organized memory comprised of a higher performance level and a relatively lower performance level, our structure and method is particularly effective when the free pointers are maintained as a two-level list, wherein a small number of free pointers are maintained at the higher performance level and the balance of the free pointers are maintained at the lower performance level. Those skilled in the art will recognize that modifications and variations can be made without departing from the spirit of our invention. Therefore, we intend that our invention encompass all such variations and modifications as fall within the scope of the appended claims.

What we claim is:

1. In a digital data processing system having a memory component, a method for managing available resources in said memory, comprising:

partitioning a first portion of said memory into n blocks;

allocating m of said blocks as pointer blocks, each adapted to store at most s pointers, where (n>m), (n>s) and ((m*s)≧(n−m));

for each of said (n−m) blocks, creating a pointer which points to said block;

storing of said pointers in each of the first (m−1) of said pointer blocks and storing the remaining ((n−m)−(m−1)*s)) of said pointers in the last of said pointer blocks, wherein the pointers stored in said pointer blocks comprise a free pointer list;

in response to a first allocation request to allocate a first block, selecting for allocation the block pointed to by a first pointer in said pointer list, allocating said selected block as said first block, and removing said first pointer from said pointer list; and if, in response to said first allocation request, the last of said pointer blocks stores 0 pointers, then, in response to a second allocation request to allocate a second block, allocating said last pointer block as said second block;

whereby a next one of said pointer blocks becomes said last pointer block.

2. The method of claim 1 further comprising:

in response to a first deallocation request to deallocate said first block:

deallocating said first block;

creating a second pointer which points to said first block; and adding said second pointer to said pointer list.

3. The method of claim 2 further comprising:
if, in response to said first deallocation request, the last of said pointer blocks stores s pointers, then, in response to a second deallocation request to deallocate a second block:
deallocating said second block;
allocating said second block as a pointer block;
whereby said second block becomes said last pointer block.

4. The method of claim 1 further comprising:
linking said m pointer blocks to form a linked list of painter blocks;
removing a last of said pointer blocks in said linked list upon the removal of the last of said pointers stored therein; and
adding a pointer block to said linked list upon the addition of the s'th pointer to the last of said pointer blocks in said linked list.

5. The method of claim 1 wherein a selected portion of said free pointer list is stored in a second portion of said memory.

6. The method of claim 5 wherein the second portion of said memory is, with respect to said first portion, smaller in size but faster in operation.

7. In a digital data processing system having a memory component, a method for managing available resources in said memory, comprising:
partitioning a first portion of said memory into at least first and second blocks;
allocating said first block as a first pointer block;
creating a first pointer which points to said second block;
storing said first pointer in said first pointer block, wherein the pointers stored in said first pointer block comprise a free pointer list;
in response to a first allocation request to allocate a block,
selecting for allocation the block pointed to by said first pointer,
allocating said selected block, and
removing said first pointer from said pointer list; and
since, in response to said first allocation request, said first pointer block stores 0 pointers, then, in response to a second allocation request, allocating said first pointer block;
whereby the free pointer list is empty.

8. The method of claim 7 further comprising:
in response to a first deallocation request to deallocate an allocated block:
deallocating said allocated block;
reallocating said deallocated block as said first pointer block.

9. The method of claim 8 further comprising:
if, in response to said first deallocation request, said first pointer block stores less than a predetermined number of pointers, then, in response to a second deallocation request to deallocate an allocated block:
deallocating said allocated block;
creating a second pointer which points to said deallocated block; and
adding said second pointer to said pointer list.

10. The method of claim 7 wherein a selected portion of said free pointer list is stored in a second portion of said memory.

11. The method of claim 10 wherein the second portion of said memory is, with respect to said first portion, smaller in size but faster in operation.

12. In a digital data processing system having a memory component, a method for managing available resources in said memory, comprising:
partitioning a first portion of said memory into blocks;
creating a free pointer list comprised of pointers, each of which points to a respective one of said blocks;
as blocks are allocated, removing the respective pointers from said free pointer list; and
as blocks are deallocated, adding respective pointers to said free pointer list;
wherein the free pointer list is stored in a linked list of said blocks, each storing no more than a predetermined number of said free pointers; and
wherein, upon the removal of the last of the free pointers stored in a block at a head of said linked list, said block is removed from said head of said linked list, whereby a next block in said linked list becomes said head of said linked list.

13. The method of claim 12 wherein, upon the addition of said predetermined number of pointers to the block at said head of said linked list, a block is added to said head of said linked list, whereby said added block in said linked list becomes said head of said linked list.

14. The method of claim 12 wherein a selected portion of said free pointer list is stored in a second portion of said memory.

15. The method of claim 14 wherein the second portion of said memory is, with respect to said first portion, smaller in size but faster in operation.

16. A method for managing, in a digital data processing system having a memory component, available resources in said memory, comprising:
partitioning a first portion of said memory into a set of free blocks;
maintaining as a free pointer list a linked list of a first set of said free blocks, each storing an ordered set of free pointers to each of the free blocks in a second set of said free blocks;
in response to a first request from said system:
allocating the block in said set of free blocks pointed to by the free pointer at the head of said free pointer list; and
removing from said free pointer list said pointer at the head thereof; and in response to a second request from said system:
returning an allocated block to said set of free blocks; and
adding to said free pointer list at the head thereof a free pointer to said returned block.

17. The method of claim 16 wherein a selected portion of said free pointer list is stored in a second portion of said memory.

18. The method of claim 17 wherein the second portion of said memory is, with respect to said first portion, smaller in size but faster in operation.

19. In a digital data processing system having a memory component, a method for managing available resources in said memory, comprising:
partitioning a first portion of said memory into at least n+1 free blocks;
allocating as a free pointer block a first one of said free blocks, said first free block being sized to store at least n free pointers each at a respective slot within said block;
initializing a head pointer to point to a first one of said slots in said free pointer block;

for each of said n other free blocks:
- storing into the slot in said free pointer block pointed to by said head pointer a free pointer to a respective one of said n free blocks; and
- advancing said head pointer to point to a next succeeding slot in said free pointer block;

in response to a first request from said system:
- retrieving from said free pointer block the one of said free pointers stored therein pointed to by said head pointer;
- allocating the free block pointed to by said retrieved free pointer; and
- retracting said bead pointer to point to a next preceding slot in said free pointer block; and in response to a second request from said system:
- advancing said head pointer to point to a next succeeding slot in said free pointer block;
- returning an allocated block to said set of free blocks; and
- storing into the slot in said free pointer block pointed to by said head pointer a free pointer to said returned free block.

20. The method of claim 19 wherein a selected portion of said free pointer list is stored in a second portion of said memory.

21. The method of claim 20 wherein the second portion of said memory is, with respect to said first portion, smaller in size but faster in operation.

22. In a digital data processing system having a faster but smaller level A memory and a slower but larger level B memory partitioned into a linked list of free blocks, a method for managing available resources in said level B memory, comprising:

- allocating a portion of the level A memory as a free pointer store;
- storing pointers to the free blocks into the free pointer store;
- initiating a push operation when the free pointer store reaches a predetermined maximum level, the push operation identifying a first free block in the linked list of free blocks and designating it as a first free pointer block, and moving the pointers from the free pointer store into the first free pointer block;
- repeating the steps of storing pointers into the free pointer store, and initiating a push operation to move the pointers from the free pointer store into subsequent free pointer blocks identified from the linked list of free blocks, until all pointers to the free blocks have been stored.

23. The method as recited in claim 22, further comprising:
- allocating free blocks using the pointers in the free pointer store in response to allocation requests; and
- initiating a pull operation to identify the first free pointer block and move pointers from the first free pointer block to the free pointer store when the number of pointers in the free pointer store reaches a predetermined minimum;
- repeating the steps of allocating free blocks using the pointers in the free pointer store, and initiating a pull operation to move pointers from subsequent free pointer blocks into the free pointer store when the number of pointers in the free pointer store reaches a predetermined minimum.

* * * * *